United States Patent Office 3,639,613
Patented Feb. 1, 1972

---

3,639,613
COMPOSITION AND METHODS FOR CONTROLLING COCCIDIOSIS IN POULTRY EMPLOYING NITROTHIOPHENE DERIVATIVES
George L. Dunn, Wayne, and John R. E. Hoover, Glenside, Pa., assignors to Smith Kline & French Laboratories, Philadelphia, Pa.
No Drawing. Filed Aug. 28, 1968, Ser. No. 755,781
Int. Cl. A61k 27/00

ABSTRACT OF THE DISCLOSURE

U.S. Cl. 424—275  10 Claims

Anti-coccidio and growth promoting compositions comprising optionally substituted nitrothiophene sulfonamides, nitrothiophene carboxamides, and nitrothiophene dicarboxamides.

---

The invention relates to novel anti-coccidial and growth-promoting nitrothiophene compositions. In another aspect it relates to methods of producing anticoccidial activity. In still another aspect it relates to novel nitrothiophene dicarboxamides having coccidiostatic activity.

In poultry, coccidiosis is a very widespread disease which occurs in the form of severe intestinal infections and often proves fatal. This disease is produced by infection with protozoa of the genus Eimeria, such as, for example, *Eimeria tenella*. The compositions in accordance with the invention make possible successful control of coccidiosis by preventing, checking and/or curing said disease. Control of the disease is accomplished by administering the composition of the invention to poultry (e.g. hens or turkey cocks) in effective quantities. The compositions can also exert a growth-promoting action in poultry, and accordingly, are also useful as growth-promoting agents.

The anticoccidial and growth-promoting compositions of the invention contain (a) a physiologically acceptable carrier material, e.g. solid or liquid poultry feed or drinking water, and a compound of generic Formula I below, or a salt thereof formed with a pharmaceutically acceptable base. These compositions control coccidiosis by preventing, checking and/or curing the disease.

Formula I

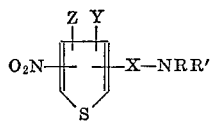

wherein:

X is CO or SO$_2$;
Y is hydrogen, alkyl straight or branched up to 10 carbon atoms, halo, such as chloro, bromo, or iodo or carbalkoxy up to 4 carbon atoms, such as carbethoxy or carbomethoxy;
R and R' are hydrogen or alkyl straight or branched up to ten carbon atoms, phenyl or benzyl; and
Z is hydrogen or —CONRR'.

It is preferred to use as an active ingredient of the novel anticoccidiol compositions, compounds as shown in Formula II below:

Formula II

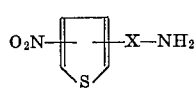

where X is as described above.

Advantageous members of Formula I which are wholly novel compounds, as well as coccidiostats, are those where X is —CO—, Y is hydrogen, and Z is —CO—NRR'; to wit:

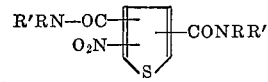

Specific compounds of demonstrated efficacy within the above formulas are:

4-nitrothiophene-2-sulfonamide,
5-nitrothiophene-2-carboxamide,
5-nitrothiophene-3-carboxamide and
4-methyl-5-nitrothiophene-2-carboxamide.

Certain sulfonamides of this invention are reported in the literature. See J. Cymerman-Craig et al., CA51: 4354d (1956). Also certain carboxamides of this were reported by Kametani et al. CA59:6366**b (1963); and Johnson et al. CA38:4002[9] (1944). However, the here disclosed activity was not suggested in any of these publications.

EXAMPLES OF SPECIFIC COMPOUNDS FALLING WITHIN FORMULA I 3-nitro-2-thiophenecarboxamide
4-nitro-2-thiophenecarboxamide
5-nitro-2-thiophenecarboxamide
5-nitro-3-thiophenecarboxamide
4-nitro-3-thiophenecarboxamide
5-nitro-3-thiophenecarboxamide
3-methyl-5-nitro-2-thiophenecarboxamide
4-methyl-5-nitro-2-thiophenecarboxamide
5-methyl-4-nitro-2-thiophenecarboxamide
3-methyl-4-nitro-2-thiophenecarboxamide
2-methyl-5-nitro-3-thiophenecarboxamide
4-methyl-5-nitro-3-thiophenecarboxamide
2-methyl-4-nitro-3-thiophenecarboxamide
5-methyl-4-nitro-3-thiophenecarboxamide
3-nitro-2-thiophenesulfonamide
5-nitro-2-thiophenesulfonamide
4-nitro-2-thiophenesulfonamide
2-nitro-3-thiophenesulfonamide
4-nitro-3-thiophenesulfonamide
5-nitro-3-thiophenesulfonamide
3-methyl-5-nitrothiophene-2-sulfonamide
4-methyl-5-nitrothiophene-2-sulfonamide
3-methyl-4-nitrothiophene-2-sulfonamide
5-methyl-4-nitrothiophene-2-sulfonamide
2-methyl-4-nitrothiophene-3-sulfonamide
5-methyl-4-nitrothiophene-3-sulfonamide
2-methyl-5-nitrothiophene-3-sulfonamide
4-methyl-5-nitrothiophene-3-sulfonamide
3-nitro-2,5-thiophenedicarboxamide
4-nitro-2,5-thiophenedicarboxamide
4-nitro-2,3-thiophenedicarboxamide
5-nitro-2,3-thiophenedicarboxamide
2-nitro-3,4-thiophenedicarboxamide
5-nitro-3,4-thiopenedicarboxamide
N-butyl-5-nitro-2-thiophenecarboxamide
N,N-diethyl-5-nitro-3-thiophenecarboxamide
N-phenyl-4-nitro-2-thiophenesulfonamide
N-benzyl-5-nitro-3-thiophenecarobxamide
N-methyl-N-phenyl-5-nitro-2-thiophenecarboxamide
4-methyl-5-nitro-2,3-thiopenedicarboxamide
3-ethyl-5-nitro-2,4-thiophenedicarboxamide
5-propyl-4-nitro-2,3-thiophenedicarboxamide
4-butyl-3-nitro-2,5-thiophenedicarboxamide
5-amyl-5-nitro-2,3-thiophenedicarboxamide
3-hexyl-5-nitro-2,4-thiophenedicarboxamide.

It will be readily apparent to one skilled in this art that certain of the nitrothiopene compounds disclosed herein (i.e. R's and Y are branched alkyl) may have asymmetric carbon atoms, thereby forming optically active d- and l-compounds. Thus, the connotation of the general formulas is intended to include the separate d- and l-optical isomers, as well as racemic mixtures of these isomers. If desired, the isomers may be separated for individual use by resolution methods known to the art, such as fractional crystallization of derivatives or salts embodying a second resolved optically asymmetric center. Alternatively, a synthesis starting with an optically active side chain may yield the desired optical isomers.

The compounds of Formula I, in which R, R', Y and Z are hydrogen and X is $SO_2$, can be prepared by treating a thiophene sulfonyl chloride with nitric acid to form the corresponding 4- and 5-nitrothiophene sulfonyl chlorides. Treatment with aqueous ammonium hydroxide yields the 4- or 5-nitrothiophene-2-sulfonamides.

The compounds of I, in which Y is alkyl, halo, or carbalkoxy, R, R', and Z are hydrogen, and X is $SO_2$, can be prepared by treating an alkyl substituted thiophene sulfonyl chloride, as outlined above, proceeding to the Y-substituted-nitro-thiophene-2-sulfonamides.

Compounds of I, in which R, R', and Y and Z are hydrogen, and X is $-SO_2-$, and Z is $-CONH_2$ can be prepared starting with a 2 or 3-thiophene sulfonyl chloride, which is nitrated to produce a mixture of 4- and 5-nitrothiophene sulfonyl chlorides, which are separated by known techniques. Amination produces the desired amide products.

Compounds of I, in which Y and Z are hydrogen, X is $-SO_2-$, and either of R and R' are alkyl, phenyl, or benzyl are prepared from the appropriate nitrothiophene sulfonyl chloride by treatment with the appropriate alkylamine, aniline, or benzylamine.

Compounds of I in which R, R', Y and Z are hydrogen, and X is $-CO-$, can be prepared by treating a nitrothiophene aldehyde with an alkali metal chromate to give the corresponding acid. Treatment of the 2- or 3-acid with thionyl chloride and ammonium hydroxide yields the corresponding nitrothiophenearboxamides.

The compounds of I, in which R, R' and Z are hydrogen, Y is alkyl, and X is CO, can be prepared by treating an alkyl substituted nitrothiophene aldehyde as outlined above, proceeding to the alkylnitrothiophene carboxamides.

Compounds of I in which R and R' are hydrogen, X is CO—, Y is alkyl, and Z is $CONH_2$ can be prepared starting with a nitrothiophene dicarboxylic acid. Treatment of the diacid with diazomethane and ammonia, or an appropriate amine, yields the corresponding nitrothiophenedicarboxamides.

Compounds of I, which are nitrothiophene dicarboxamides, and Y is hydrogen are prepared by 2,3-thiophenedicarboxaldehyde, and nitrating to form the 5-nitro-derivative. Oxidation of the dialdehyde gives the diacid, which is alkylated to form the diester. The diester is aminated to yield the 5-nitrodicarboxamide.

The compositions of the invention are prepared by mixing compounds of I and II in uniform and finely divided form in a liquid or solid feed, or dispersing them in poultry drinking water. Standard commercial poultry feed products can be used as the liquid or solid feed. Additionally other compositions containing ingredients suitable for poultry nutrition can also be employed, such as, animal feed products. For controlling coccidiosis in poultry, the instant compositions contain between about 0.005 and about 0.050 weight percent, based on total feed weight preferably about 0.0125 and about 0.0250 weight percent, of the described compounds. For producing a promotion of growth, the instant composition contains between about 0.003 and about 0.0125 weight percent, of a described nitrothiophene. In special cases it may be convenient to use concentrations which are smaller or larger than the preferred values named above.

A uniform distribution of the active compounds in the carrier material can easily be effected according to the usual methods, by mixing, grinding, stirring them with solid feed, or by spraying dilute solutions (preferably in water) of them onto feed.

These compounds are not water soluble. Therefore, for the manufacture of aqueous preparations, an aqueous dispersion must be prepared using the usual emulsifiers. The alkali metal salts of the sulfonamides such as the sodium or potassium salt are sometimes suitable as salts of Formula I. A emulsifiers, the nonionic emulsifiers are preferred, e.g., polyoxyethylene sorbitan monooleate or laurate or polyoxyethylene ricinoleate, etc.

When a feed in which the compounds have been incorporated in accordance with the invention is administered to poultry, an undisturbed feed uptake is observed, even after infection with sporulated oocysis. The general condition of the poultry remains unaltered, and no clinical manifestation is observed.

In another embodiment of the invention, the compounds can also be utilized in compositions in the form of concentrates which then, as additives, are diluted with the basic feed prior to feeding. The compositions in the form of concentrates contain the above compounds in concentrations of about 5 to 95 weight percent, preferably about 10 to about 25 weight percent of the weight of concentrate, the remainder being a physiologically acceptable carrier material, such as those employed above, or one or more of the following: grain, side products of the milling industry, ground oil cake, distillation residues of the fermentation industry, finely divided mineral materials, ground oyster shell, silicon dioxide, etc. Fats, oils, antioxidants and surface active materials can also be employed as the carrier material for these concentrates.

EXAMPLE 1

Day 0.—Eleven day old unsexed "Moyer" breed birds are received from Moyer's Chicks Poultry Farm. The birds are culled and placed in cages, four birds to a cage. They are weighed and put on different medicated diets as described below, except the untreated controls.

Day 1.—The birds are infected orally with 100,000 sporulated oocysts/bird of Eimeria tenella (to produce about 50% mortality in the infected controls). The inoculum was quantum sufficited to 1 ml.=100,000 oocysts. A 5 or 10 ml. pipette with a wide orifice is used, per os administration.

2 sets of 4 birds each were used in below categories

Uninfected controls
Infected but not treated controls
Amprolium plus (Merck) 0.025% diet
Amprolium plus (Merck) 0.003125% diet.

Candidate coccidiostats: 0.055, 0.025%, 0.0125%, 0.0625% of diet.

Day 3.—Individual cages are removed from racks and weighed. These weights are then recorded.

Day 7.—The birds are sacrificed and the group weight is recorded. A gross inspection of the ceca is performed and scored according to the following key:

0=Normal cecum
1=Light infection—No thickening, less than 20 lesions
2=Moderate infection—Thickening, less than 20 lesions
3=Heavy infection—More than 20 lesions, coring, blood
4=Death (after 120 hours).

Then the data is calculated for cecal score and percent infection.

$$\text{Cecal score} = \frac{\text{Total score of group}}{\text{Number of birds in group}}$$

$$\text{Percent Infection} = \frac{\text{Cecal score}}{4 \text{ (highest possible cecal score}}$$

After the computation of average weight, average weight gain, cecal score, and percent infection this information is listed on a permanent record in the following manner:

(1) Marginally active compounds (infectively reduced less than 50%).
(2) Active compounds (infectively reduced more than 50%).
(3) Toxic compounds (characterized by weight loss, good deal of feed remaining, no-coccidial death of 2 or more birds).
(4) Repeat compounds.
(g) Controls.

Compounds which show activity (50%) are repeated at the same dosage level (0.05%), if activity is repeated, compounds may be titrated down at .025, .0125 and .00625%. Compounds which are toxic are repeated at half dosage level. (0.025%).

Procedure for preparation of coccidial diets

Prior to mixing the diets, Quaker Oats "Full O' Pep" Chick Starter Feed is weighed out in 1 kilo quantities and put in flat polyethylene 12" x 18' .002 bags.

The basal diet is a *plain* feed, in which there is *no Coccidiostat added*. A premix is prepared by adding 500 mg. of the test compound into approximately 50 grams of the basal diet. Triturate compound(s) with feed by mortar and pestle to obtain a homogeneous mixture.

The premix was added to 950 grams of basal diet in a polyethylene container, placed on a multiple diet mixer (capacity for mix 20 diets simultaneously) and allowed to run for 1 hour. The final concentration of the test compound in the diet is 0.5%. Lower concentrations were prepared by admixing appropriate ratios of basal diet with the 1000 g. batches, or aliquots thereof, of this 0.5% medicated feed.

The results were compiled in the following table:

| Compound, percent activity | Concentration level in feed, percent | | | | |
|---|---|---|---|---|---|
| | 0.05 | 0.025 | 0.0125 | 0.00625 | 0.003125 |
| 4-nitrothiophene-2-sulfonamide | 100 | 80 | 80 | N.T. | N.T. |
| 5-nitro-2-thiophenecarboxamide | 80 | N.T. | N.T. | N.T. | N.T. |
| 4-nitro-2-thiophenecarboxamide | 44(r) | N.T. | N.T. | N.T. | N.T. |
| 5-nitrothiophene-3-carboxamide | 100 | N.T. | N.T. | N.T. | N.T. |
| 3-methyl-5-nitrothio-phene-2-carboxamide | 47(r) | N.T. | N.T. | N.T. | N.T. |
| 4-methyl-5-nitrothiophene-2-carboxamide | 60(r) | N.T. | N.T. | N.T. | N.T. |

N.T.=not tested this level.

EXAMPLE 2
Preparation of 5-nitro-2-thiophenecarboxamide

A solution of 5-nitro-2-thiophenecarboxylic acid [from 5-nitro-2-thiophene carboxaldehyde as described by G. Lever, J. Am. Chem. Soc., 77, 577 (1955)] (5 g.) in 17.5 g. of thionyl chloride is heated at reflux for 1.5 hr. The excess thionyl chloride is evaporated in vacuo at 50° C. to give 5-nitro-2-thiophenecarbonyl chloride. The acid chloride is dissolved in 10 ml. of acetone, and added dropwise to a stirring solution of 25% aqueous ammonia (25 ml.). When addition is complete the mixture is stirred at room temperature for 15 min. and then the precipitated solid is collected and is washed with water. Recrystallization from aqueous acetone gives 3.0 g. of desired amide; M.P. 188.5–190° C.

EXAMPLE 3
Preparation of 4-nitro-2-thiophenecarboxamide

A solution of 4-nitro-2-thiophenecarboxylic acid (4.7 g) [prepared as described by G. Lever, J. Amer. Chem. Soc., 77, 577 (1955)] in 16 g. thionyl chloride is heated at reflux for 1.5 hours and then the excess thionyl chloride is removed by heating in vacuo to give 4-nitro-2-thiophenecarbonyl chloride. A solution of the acid chloride in 10 ml. of acetone is added dropwise to a rapidly stirring solution of 25% aqueous ammonia (25 ml.). When the addition is complete the reaction is stirred another 15 minutes and then the precipitated solid is collected, and washed with water. The crude product is recrystallized from hot water to give 3.35 g. of the desired amide, M.P. 149–151.5° C.

EXAMPLE 4
Preparation of 5-nitro-3-thiophenecarboxamide

A solution of 2.3 g. of 5-nitro-3-thiophenecarboxylic acid (prepared according to Campaigne and Bourgeois, J. Amer. Chem. Soc., 76, 2445 (1954) in 50 ml. of thionyl chloride is heated at reflux for 3.5 hours and is worked up in the usual manner. The crude acid chloride is dissolved in acetone (15 ml.) and added dropwise to a stirring solution of 30% aqueous ammonia (120 ml.). The product is isolated as described in previous examples, and is recrystallized from water to give 1.3 g. of desired amide, M.P. 163–164° C.

EXAMPLE 5
Preparation of 5-methyl-4-nitrothiophene-2-carboxamide

Ten grams of 5-methyl-2-thiophenecarboxylic acid (Aldrich Chemical Co.) is added, in small portions, during 45 min. to a cold (−5° C.) stirring solution, consisting of 40 ml. of concentrated nitric acid and 23 ml. of concentrated sulfuric acid. When addition of the acid is complete the mixture is allowed to stir at −5° C. for 20 mins. and then it is poured into a mixture of crushed ice and water. The solid is collected, washed with water, and is dissolved in aqueous sodium bicarbonate. The alkaline solution is extracted with ether, and the aqueous layer is then acidified with dilute hydrochloric acid. The solid is collected and air dried, to give 7.5 g. of desired acid intermediate, M.P. 179–180° C.

A solution of the above 5-methyl-4-nitro-2-thiophene-carboxylic acid (7.5 g.) in a mixture of benzene (70 ml.) and thionylchloride (30 ml.) is heated at reflux for 4 hours. Excess solvent and thionyl chloride are removed by heating in vacuo, and the crude acid chloride is dissolved in 25 ml. of acetone, and added dropwise to 25% aqueous ammonia (180 ml.), as described in previous examples. The crude amide is recrystallized from 2–B alcohol[1] to give 5 g. of desired amide, M.P. 223–224° C.

EXAMPLE 6
Preparation of 3-methyl-5-nitrothiophene-2-carboxamide

Following a procedure described in U.S. Pat. 2,746,972, a solution of 3-methyl-2-thiophenecarboxaldehyde (25.2 g.) [prepared by the method of Campaigne and Archer, J. Amer. Chem. Soc., 75, 989 (1953)] in 90 ml. of acetic anhydride, is gradually added to a mixture of 9 ml. of fuming nitric acid and 120 ml. of glacial acetic acid at 5° C. When addition is complete, the mixture is allowed to stir 5 hours at room temperature, and then it is poured into a mixture of crushed ice and water. The gummy semisolid is collected and dried on a porous plate to give 25 g. of desired nitro intermediate, M.P. 55–56° C.

A mixture of the above 3-methyl-5-nitro-2-thiophene-carboxaldehyde diacetate (131.5 g.) and 33% aqueous sulfuric acid (770 ml.) are heated at reflux for 30–40 mins. The mixture is extracted with ether and the dried ether extract is evaporated in vacuo to give a dark oil. Upon standing 24 hours a dark solid formed, which is separated from remaining oil. The crude solid is dried on a porous plate to give 24.5 g. of brown solid, M.P. 88–90° C. Recrystallization from benzene-petroleum ether (30–60° C.)

gives two crops of desired aldehyde, 10 g. and 6.5 g., each with the same melting point of 93–94° C.

To a suspension of 3-methyl-5-nitro-2-thiophenecarboxaldehyde (1.19 g.) in 11.7 ml. of 33% aqueous sulfuric acid is added, during 5 minutes, a solution of sodium dichromate (1.83 g.) in 1 ml. of water while maintaining the internal reaction temperature at 35–40° C. When addition is complete, stirring is continued for 1 hour at 30–35° C. and then for 1 hour at 0–5° C. The precipitated solid is collected, and then is dissolved in aqueous sodium bicarbonate solution. The alkaline solution is extracted with ether to remove unchanged aldehyde, is acidified, and the product is collected. Recrystallization from water gives 0.45 g. of the desired acid intermediate M.P. 183° C.

This 3-methyl-5-nitro-2-thiophenecarboxamide was prepared from 1.7 g. of the above 3-methyl-5-nitro-2-thiophenecarboxylic acid, by the same procedure described in Example 5 for the preparation of 5-methyl-4-nitro-2-thiophenecarboxamide. The crude product was recrystallized from water, containing a small amount of 2–B alcohol[1] to give 1.3 g. of pure amide, M.P. 164–166° C.

EXAMPLE 7

Preparation of 4-methyl-5-nitro-2-thiophenecarboxamide

The preparation of this compound was carried out according to the procedure described earlier, for the preparation of 4-methyl-5-nitro-2-thiophenecarboxaldehyde diacetate, by nitrating 4-methyl-2-thiophenecarboxaldehyde (12.6 g.) (prepared as described by Sice, J. Org. Chem., 19, 70 (1954)) to give 9.7 g. of desired product, M.P. 83.5–84.5° C.

Following the hydrolysis procedure used earlier (Example 6) on the 3-methyl isomer, 3.2 g. of the desired aldehyde, M.P. 49–50° C. was obtained from 9.9 g. of 4-methyl-5-nitro-2-thiophenecarboxaldehyde, diacetate.

Following the procedure described earlier for the preparation of the 3-methyl isomer, 1.19 g. of 4-methyl-5-nitro-2-thiophenecarboxaldehyde is converted to 0.6 g. of the desired acid intermediate, M.P. 181–182° C.

A 3.5 g. quantity of the above 4-methyl-5-nitro-2-thiophenecarboxylic acid, was converted to 2.5 g. of the desired amide, M.P. 169–170° C. by the procedure used for the synthesis of the 3-methyl isomer.

EXAMPLE 8

Preparation of 4-nitro-thiophene-2-sulfonamide 2-thiophene sulfonyl chloride (Eastman Products) (50 g.–0.274 m.) is added with stirring during 1 hour, maintaining the internal temperature between 0 and 5° C., to 196 ml. of yellow fuming nitric acid. After the addition is completed the reaction mixture is allowed to stir an additional 2 hours at 25–30° C. The mixture is cooled, 200 ml. of chloroform is added, and then it is poured over 625 grams of crushed ice. The layers are separated and the aqueous layer is extracted using 2× 200 ml. of chloroform. The organic fractions are combined, dried, and the solvent evaporated in vacuo. The residue is distilled at 0.2 mm. giving 5 fractions (1) B.P. 90–104° C., (2) B.P. 105–113° C., (3) B.P. 113–117° C., 17 g., (4) B.P. 116.5–117° C., 17.7 g., (5) B.P. 115° C., 17 g. Fraction (3) is redistilled using a 30 mm. Widmer column at 0.01 mm. giving 2 fractions of 5-nitro-2-thiophenesulfonyl chloride (1) B.P. 104–106° C., 4.3 g., (2) B.P. 106° C. 6.65 g. The residue was distilled at 0.3 mm. using a short column yielding 3 g. of 4-nitro-2-thiophenesulfonyl chloride.

4-nitro-2-thiophenesulfonyl chloride (5 g.) is dissolved in 250 ml. of THF. Gaseous NH₃ is bubbled in with stirring for 2.5 minutes maintaining the temperature at 0–5° C. The cooling bath is removed and the reaction mixture allowed to stand 10 minutes. The precipitated NH₄Cl is filtered and washed with tetrahydrofuran (THF). The filtrate is evaporated in vacuo giving 4.3 g. of crude 4-nitro - 2 - thiophenesulfonamide, M.P. 145–150° C. The amide is recrystallized from 150 ml. of boiling water after treatment with Darco, to give 3.1 g. of tan plates, M.P. 164–165° C.

EXAMPLE 9

Preparation of 5-nitro-2-thiophenesulfonamide 5-nitro-2-thiophenesulfonyl chloride (from Example 8) (2.6 g.) is dissolved in 125 ml. of THF. Gaseous NH₃ is bubbled in with stirring for 2 minutes, maintaining the temperature at 0–5° C. The cooling bath is removed and the reaction mixture is allowed to stand 10 minutes. The precipitated NH₄Cl is filtered and washed with THF. The filtrate is evaporated in vacuo giving 2.3 g. of crude 5-nitro-2-thiophenesulfonamide, M.P. 128–132° C. This amide is recrystallized from 65 ml. of boiling water after treatment with Darco, to give 1.9 g. of tan needles, M.P. 135–137° C.

EXAMPLE 10

Preparation of 5-nitro-2,3-thiophenedicarboxamide

A solution of 2,3-thiophenedicarboxaldehyde (44.7 g.) [prepared by the method of Pastour, Savalle and Eymery, C. R. Acad. Sci., Paris, 260, 6130 (1965)] in 270 ml. of acetic anhydride, is added to 180 ml. of acetic anhydride containing 2 ml. of concentrated sulfuric acid, and the resulting solution is allowed to stand overnight.

The mixture is then added during 30 minutes to a solution of 19.2 ml. of fuming nitric acid in 160 ml. of glacial acetic acid all at 5° C. When addition is complete, the reaction mixture is allowed to stir 3.5 hours at room temperature and then is poured onto 2.5 kg. of crushed ice. The precipitated solid is collected, dried, and recrystallized from four times from 2–B alcohol[2], and then from acetonitrile to give 63 g. of dialdehyde tetraacetate, M.P. 124–126° C.

The tetraacetate is suspended in 500 ml. of 33% aqueous sulfuric acid, and the mixture is heated at reflux for 40 min. The cooled mixture is extracted with ether, the combined extracts are dried and evaporated, to give 27 g. of the desired nitro dialdehyde intermediate, M.P. 98–99° C.

A solution of sodium dichromate (35.7 g.) in 21 ml. of water is added dropwise during 5 min. to a suspension of 5-nitro-2,3-thiophenedicarboxaldehyde (12.5 g.) in 125 ml. of 33% aqueous sulfuric acid while maintaining the internal temperature at 35–40° C. Stirring is then allowed to continue 1 hour at 35–40° and an additional 1 hour at 5° C. The precipitated solid is collected to give 4.8 g. of crude diacid, M.P. 162° C.

The diacid is dissolved in 1500 ml. of ether, treated with excess ethereal diazomethane and then the solvent is evaporated in vacuo. The solid residue (3 g.) is recrystallized from isopropyl alcohol to give 2 g. of desired diester, M.P. 65–67° C.

Ammonia was bubbled into a solution of the above dimethyl 5-nitro-2,3-thiophenedicarboxylate (2 g.) in 100 ml. of methanol for 10 min. at room temperature. Another 100 ml. portion of methanol is added and the solution is heated at reflux for 2 hours. The solid which precipitates when the reaction is cooled is collected, 0.9 g. The filtrate is evaporated and the residue is recrystallized from methanol to a second portion of diamide, 0.5 g. The combined diamide precipitates (1.4 g.) are recrystallized from methanol to give 0.7 g. of pure diamide, M.P. 274° (dec.).

EXAMPLE 11

Preparation of N-butyl-5-nitro-2-thiophenecarboxamide

A solution of 5-nitro-2-thiophenecarbonyl chloride (2 g.), from Example 2, in 100 ml. of tetrahydrofuran is

---

[1] 2–B alcohol when referred to herein is 190 proof ethyl alcohol containing 0.5% by volume of benzene.

[2] See footnote 1.

added dropwise to a solution of n-butylamine (1.4 g.) in 50 ml. of tetrahydrofuran. After stirring 10 min. at 5° C. the precipitated amine hydrochloride is removed by filtration and the filtrate is evaporated to a solid in vacuo. Recrystallization of this solid gives a good yield of pure amide.

EXAMPLE 12

Preparation of N,N-diethyl-5-nitro-3-thiophenecarboxamide

Following the procedure outlined above (Example 11) using 2 g. of 5-nitro-thiophenecarbonyl chloride and 1.4 g. of diethylamine gives a good yield of the corresponding tertiary amide.

EXAMPLE 13

Preparation of N-benzyl-5-nitro-3-thiophenecarboxamide

Substituting benzylamine (1.9 g.) for diethylamine in Example 12 gives a good yield of the corresponding amide.

EXAMPLE 14

Preparation of N-phenyl-4-nitro-2-thiophenesulfonamide

A solution of 4-nitro-2-thiophenesulfonyl chloride (2.4 g.) in 100 ml. of THF is added dropwise to a cold solution of aniline (1.9 g.) in 50 ml. of THF. After stirring one hour at 5° C. the aniline hydrochloride is removed by filtration and the filtrate is evaporated in vacuo to give a crude product. This material is recrystallized to give a pure sample of the N-phenyl amide.

What is claimed is:

1. A feed composition for controlling coccidiosis in poultry, which comprises an orally ingestible poultry feed carrier and admixed therein a coccidiosis controlling but non-toxic amount of a coccidiostatic agent of the formula:

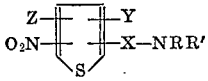

(I)

wherein:
X is CO or $SO_2$;
Y is hydrogen, alkyl straight or branched up to 10 carbon atoms, halo or carbalkoxy to four carbon atoms;
R and R' and hydrogen or alkyl straight or branched up to 10 carbon atoms; phenyl, or benzyl; and
Z is hydrogen or —CO—NRR'.

2. A composition of claim 1 having an agent of said formula wherein both R's, Y and Z are hydrogen and X is CO.

3. An anticoccidial feed composition in accordance with claim 1 wherein 4-nitrothiophene-2-sulfonamide is present in from 0.003 to 0.05 weight percent of said composition.

4. An anticoccidial composition in accordance with claim 1 wherein 5-nitrothiophene-3-carboxamide is present in from 0.003 to 0.05 weight percent of the composition.

5. An anticoccidial composition in accordance with claim 1 wherein 5-nitrothiophene-3-carboxamide is present in from 0.003 to 0.05 weight percent of the composition.

6. The method for controlling coccidiosis in poultry, which comprises orally administering to said poultry a coccidiosis controlling amount of a composition comprising an orally ingestible poultry feed carrier and admixed therein a compound of the formula:

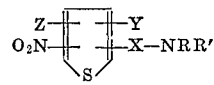

(II)

R and R' are hydrogen or alkyl straight or branched up to 10 carbon atoms; phenyl or benzyl;
X is CO or $SO_2$;
Y is alkyl straight or branched up to 10 carbon atoms; hydrogen halo or carbalkoxy to 4 carbon atoms; and
Z is hydrogen or —X—NRR'.

7. A method of claim 1 having an agent of said formula wherein both R's, Y and Z are hydrogen, and the X is CO.

8. A method in accordance with claim 6 wherein 4-nitrothiophene-2-sulfonamide is present in from 0.003 to 0.05 weight percent of the composition.

9. A method in accordance with claim 6 wherein 5-nitrothiophene-2-carboxamide is present in from 0.003 to 0.05 weight percent of the composition.

10. A method in accordance with claim 6 wherein 5-nitrothiophene-3-carboxamide is present in from 0.003 to 0.05 weight percent of the composition.

References Cited

Yew et al., J.A.C.S. vol. 72 (1950), p. 5715.
Johnson et al., Chem. Abst. vol. 38 (1944), p. 4002⁹.
Bulkacz et al., Chem. Abst. vol. 69 (1968), p. 25270a.
Dann et al., Chem Abst. vol. 41 (1947), p. 3090g.
Umezawa et al., Chem. Abst. vol. 64 (1966), p. 2450h and 2451.

SAM ROSEN, Primary Examiner

U.S. Cl. X.R.
260—332.2